US010410009B2

(12) United States Patent
Bhuiyan et al.

(10) Patent No.: US 10,410,009 B2
(45) Date of Patent: Sep. 10, 2019

(54) PARTIAL-CONTEXT POLICY ENFORCEMENT

(71) Applicant: Oracle International Corporation, Redwood Shores, CA (US)

(72) Inventors: Helali Bhuiyan, Redmond, WA (US); Daniel M. Vogel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 67 days.

(21) Appl. No.: 15/453,085

(22) Filed: Mar. 8, 2017

(65) Prior Publication Data
US 2017/0262648 A1 Sep. 14, 2017

Related U.S. Application Data

(60) Provisional application No. 62/305,297, filed on Mar. 8, 2016.

(51) Int. Cl.
| | |
|---|---|
| G06F 17/27 | (2006.01) |
| G06F 17/28 | (2006.01) |
| G06F 21/62 | (2013.01) |
| H04L 29/06 | (2006.01) |
| G06F 16/901 | (2019.01) |

(52) U.S. Cl.
CPC ...... *G06F 21/6218* (2013.01); *G06F 16/9024* (2019.01); *G06F 17/271* (2013.01); *G06F 17/274* (2013.01); *G06F 17/2836* (2013.01); *H04L 63/10* (2013.01); *H04L 63/20* (2013.01)

(58) Field of Classification Search
CPC .. G06F 21/6218; G06F 17/271; G06F 17/274; G06F 17/2836; G06F 17/30958; H04L 63/10; H04L 63/20

USPC .......................................................... 726/1
See application file for complete search history.

(56) References Cited

U.S. PATENT DOCUMENTS

| | | | |
|---|---|---|---|
| 6,030,689 | A | 2/2000 | Matsubaguchi et al. |
| 6,324,680 | B1 | 11/2001 | Barnfield et al. |
| 7,328,287 | B1 | 2/2008 | Arumugham et al. |
| 8,127,336 | B2 | 2/2012 | Bienek et al. |
| 9,021,008 | B1 | 4/2015 | Andrus et al. |

(Continued)

*Primary Examiner* — Michael Pyzocha
*Assistant Examiner* — Zoha Piyadehghibi Tafaghodi
(74) *Attorney, Agent, or Firm* — Invoke

(57) ABSTRACT

Techniques for making preliminary authorization determinations based on partial contextual information are disclosed. In one or more embodiments, an API receives an authorization request and partial contextual information associated with the authorization request. The API submits the partial contextual information to an authorization service, without submitting complete contextual information associated with the authorization request. The API receives, from the authorization service, a preliminary authorization response based on the partial contextual information. The preliminary authorization includes one of (a) denial of the authorization request and (b) non-denial of the authorization request. Based on the authorization request including non-denial of the authorization request, the API further processes the authorization request by obtaining a final authorization result based on the complete contextual information associated with the authorization request and, responsive to the authorization request, providing the final authorization result.

20 Claims, 14 Drawing Sheets

(56) References Cited

U.S. PATENT DOCUMENTS

| | | | |
|---|---|---|---|
| 9,282,122 | B2 | 3/2016 | Cabrera et al. |
| 9,325,739 | B1 | 4/2016 | Roth et al. |
| 9,386,040 | B2 | 7/2016 | Hu |
| 9,407,615 | B2 | 8/2016 | Shah et al. |
| 9,648,040 | B1 | 5/2017 | Morkel et al. |
| 9,854,001 | B1 | 12/2017 | Roth et al. |
| 10,043,030 | B1* | 8/2018 | Kruse .................. G06F 21/6227 |
| 2002/0091942 | A1 | 7/2002 | Cooper et al. |
| 2002/0165960 | A1 | 11/2002 | Chan |
| 2002/0166052 | A1 | 11/2002 | Garg et al. |
| 2005/0015621 | A1 | 1/2005 | Ashley et al. |
| 2007/0233957 | A1 | 10/2007 | Lev-Ran et al. |
| 2009/0287565 | A1* | 11/2009 | Bishop .................. G06Q 20/02 |
| | | | 705/14.38 |
| 2011/0016507 | A1 | 1/2011 | Becker |
| 2011/0065071 | A1 | 3/2011 | Duffy |
| 2012/0167200 | A1 | 6/2012 | Buchholz et al. |
| 2012/0304249 | A1 | 11/2012 | Luo et al. |
| 2012/0311674 | A1 | 12/2012 | Hockings et al. |
| 2013/0004078 | A1 | 1/2013 | Miyazaki et al. |
| 2013/0014286 | A1* | 1/2013 | Falk ....................... G06F 21/10 |
| | | | 726/30 |
| 2013/0081141 | A1 | 3/2013 | Anurag |
| 2015/0074670 | A1 | 3/2015 | Gerganov |
| 2015/0135261 | A1* | 5/2015 | Park ...................... H04L 63/102 |
| | | | 726/1 |
| 2015/0269369 | A1* | 9/2015 | Hamid .................. G06F 21/31 |
| | | | 726/5 |
| 2016/0006693 | A1 | 1/2016 | Salcedo |
| 2016/0050198 | A1 | 2/2016 | Thibadeau et al. |
| 2016/0072787 | A1 | 3/2016 | Balabine et al. |
| 2016/0156671 | A1 | 6/2016 | Cabrera et al. |
| 2016/0364377 | A1 | 12/2016 | Krishnamurthy |

\* cited by examiner

Syntax Graph
400

Graph Segment 500A

Graph Segment 500B

Syntax Graph 600

PARTIAL-CONTEXT POLICY ENFORCEMENT

BENEFIT CLAIM; INCORPORATION BY REFERENCE

This application claims benefit of U.S. Provisional Patent Application 62/305,297 filed on Mar. 8, 2016, the entire contents of which are hereby incorporated by reference.

TECHNICAL FIELD

The present disclosure relates to authorization policies. In particular, the present disclosure relates to preliminary authorization determinations based on partial contextual information.

BACKGROUND

In general, it is important to establish not only who can physically access a particular computer system, but what functions they can perform once they have physical access. Without properly controlling access, a malicious or otherwise unwelcome user may retrieve sensitive data from the computer system. Alternatively, a malicious or otherwise unwelcome user may use the computer system's functionality in an unintended or undesirable manner.

Authorization policies are rules that define what functions each user can perform within a computer system. For example, authorization policies may define what resources different users are allowed to access and what actions they are allowed to perform on those resources. In some cases, users are assigned to different user groups. Authorization policies may be defined at a user group level. For example, a particular user may belong to a system administrators group. Generally, system administrators have access to more resources and functionality of the computer system than standard users.

In cloud computing, many different users may be accessing the same cloud service from different locations. Authorization policies are important to ensure that different users do not have access to each other's private data and functionality. For example, cloud services are often multi-tenancy applications, i.e., having multiple tenants (sometimes also referred to as subscribers, if there is a subscription contract to use the cloud service) accessing the same resources directly and/or through virtualization. Generally, different tenants share system resources without sharing each other's private data and functionality. A particular tenancy may also have multiple user groups. Data access and functionality may be different between different user groups in the same tenancy. For example, a particular tenancy may have access to a particular virtual machine hosted by a cloud service, and there may be different authorization policies for different users and/or user groups accessing that particular virtual machine.

Managing authorization policies becomes more complicated as computer systems become larger and more distributed. For example, a cloud service may rely on redundancy to help ensure system uptime. It can be challenging to keep authorization policies synchronized across redundant locations. Also, as the number of tenancies grows, the system overhead associated with authorizing users of those tenancies also grows. Each attempt to perform an action on a resource may result in network traffic to ask the cloud service whether the action is authorized. These authorization requests may consume considerable network resources. Authorization requests may also demand considerable processing time for the cloud service to handle, particularly as the number of users making authorization requests increases.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
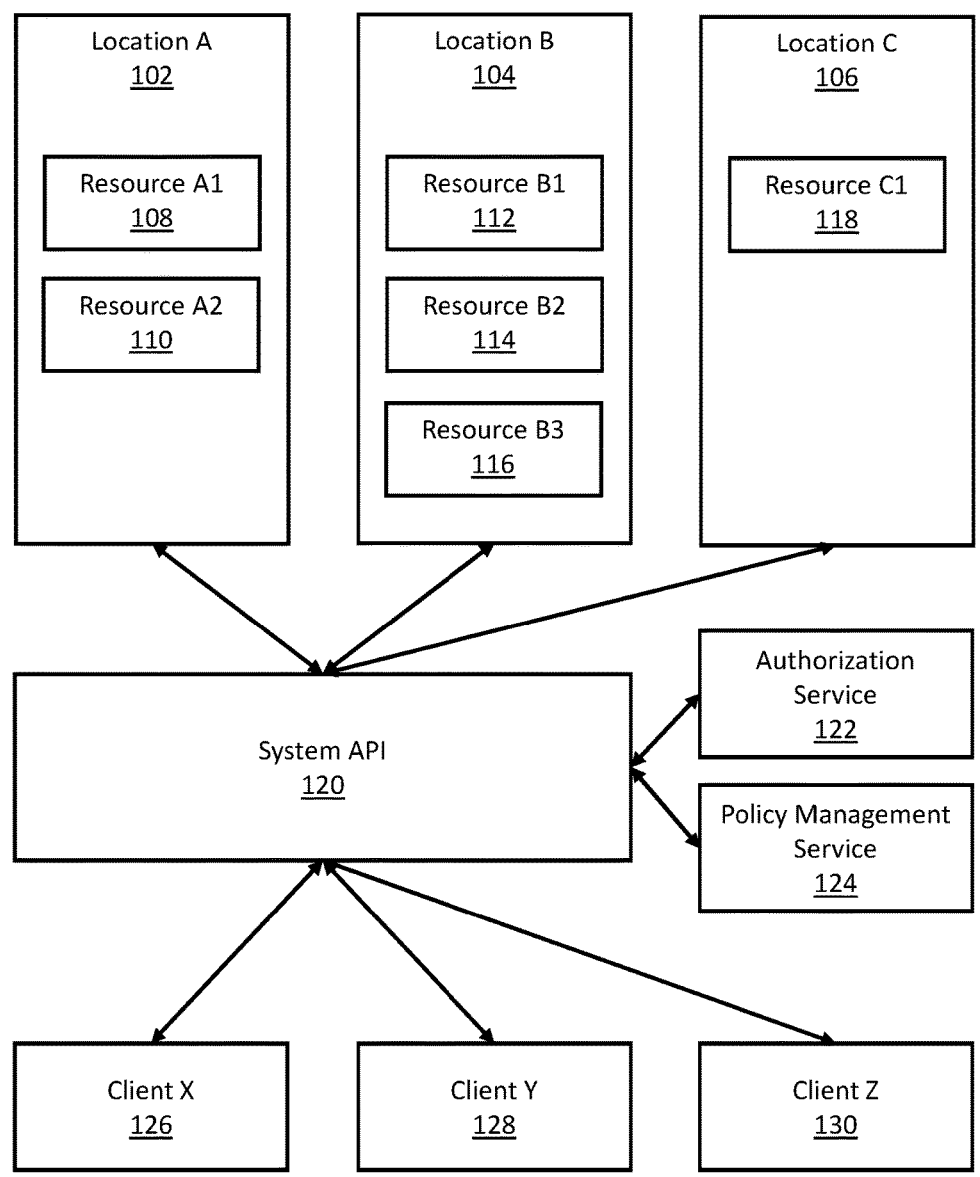
FIG. 1 shows a block diagram that illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. AUTHORIZATION POLICY ENFORCEMENT ARCHITECTURE
3. POLICY STATEMENT MANAGEMENT ARCHITECTURE
4. STORING A USER-DEFINED POLICY STATEMENT IN A SYNTAX GRAPH
5. EXAMPLE EMBODIMENTS OF SYNTAX GRAPHS
6. STORING A MULTI-POLICY SYNTAX GRAPH

7. AUTHORIZATION REQUEST HANDLING ARCHITECTURE

8. POLICY DATA CACHE ARCHITECTURE

9. USING A POLICY DATA CACHE

10. LOCALIZING POLICY STATEMENTS

11. COMPUTER NETWORKS AND CLOUD NETWORKS

12. MISCELLANEOUS; EXTENSIONS

13. HARDWARE OVERVIEW

1. General Overview

One or more embodiments include generating a preliminary authorization based on partial contextual information. An application programming interface (API) of a computer system receives an authorization request from a client. Specifically, the API receives partial contextual information associated with the authorization request. The API submits the partial contextual information to an authorization service and receives a preliminary authorization response based on the partial contextual information.

In one or more embodiments, if the preliminary authorization response is a denial, then the API denies the authorization request. For example, the API may deny the authorization request if the authorization service fails to locate any authorization policy that the authorization request could possibly satisfy. If the preliminary authorization response is a non-denial (i.e., not a denial, but also not an approval), then a final authorization result is obtained based on complete contextual information associated with the authorization request. If the preliminary authorization response is a denial, then no attempt is made to obtain a final authorization result based on complete contextual information.

In one or more embodiments, the preliminary authorization response includes policy data, and the final authorization result is obtained using the policy data, without transmitting the complete contextual information to the authorization service. Policy data returned with the preliminary authorization response may be used to obtain a preliminary authorization response for a later authorization request.

In one or more embodiments, a thick client is configured to obtain the final authorization result using policy data received from the authorization service via the API. Alternatively or in addition, a thin client may not be configured to store policy data locally, and may instead obtain the final authorization service by transmitting the complete contextual information to the authorization service via the API.

One or more embodiments described in this Specification and/or recited in the claims may not be included in this General Overview section.

2. Authorization Policy Enforcement Architecture

FIG. 1 illustrates a system 100 in accordance with one or more embodiments. As illustrated in FIG. 1, the system 100 includes multiple resources (e.g., 108, 110, 112, 114, 116, 118) in multiple locations (e.g., 102, 104, 106), a system application programming interface (API) 120, an authorization service 122, a policy management service 124, and multiple clients (e.g., 126, 128, 130). The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In one or more embodiments, a resource (e.g., 108, 110, 11, 114, 116, 118) is a system component implemented in hardware and/or software to which a client can request access. For example, a resource may be a file, a user profile, a network, a storage volume, or any other type of resource (or combination thereof), to which access can be managed using authorization policies. Access to resources is managed using authorization policies as described in further detail below.

In one or more embodiments, a location (e.g., 102, 104, 106) is a logical and/or physical separation of resources. For example, different locations may be different physical devices. Alternatively or in addition, different locations may be different logical compartments. For example, different locations may be different virtual machines or different zones or containers in a virtualized environment. Different locations may correspond to different tenancies in a cloud service. Access to locations is managed using authorization policies as described in further detail below.

In one or more embodiments, a location is implemented using a storage unit and/or device (e.g., a file system, database, collection of tables, or any other storage mechanism) for storing data. Further, a location may be implemented using multiple different storage units and/or devices. The multiple different storage units and/or devices may or may not be of the same type or located at the same physical site. Further, a location may be implemented or may execute on the same computing system as other elements of the system 100. Alternatively or additionally, a location may be implemented or executed on a computing system separate from other elements of the system 100. A location may be communicatively coupled to other elements of the computer system 100 via a direct connection or via a network.

In one or more embodiments, a client (e.g., 126, 128, 130) of the system 100 refers to hardware and/or software configured to use resources of the system 100. For example, a client may be an application or service associated with a particular tenant. A tenant may be a corporation, organization, enterprise or other entity that accesses a shared computing resource, such as one or more resources (e.g., 108, 110, 112, 114, 116, 118) of the system 100. In an embodiment, different tenants are independent from each other. A business or operation of one tenant is separate from a business or operation of another tenant.

In one or more embodiments, a client (e.g., 126, 128, 130) is configured to request access to a particular resource of the system 100 by submitting an authorization request via a system application programming interface (API) 120. An authorization request is a request to authorize a particular requestor to perform a particular action on a particular resource in a particular location in the system 100. The authorization request may include other information.

In one or more embodiments, a system API 120 refers to hardware and/or software configured to provides a set of functions and protocols through which clients can access parts of the system 100, such as an authorization service 122. Specifically, the system API 120 provides an interface for a client to submit an authorization request to be processed, in whole or in part, by the authorization service 122. The system API 120 may be further configured to perform operations for generating a preliminary authorization response to an authorization request. Additional embodiments and/or examples are described in further detail below.

In one or more embodiments, an authorization service 122 refers to hardware and/or software configured to perform operations described herein for handling an authorization request from a client (e.g., 126, 128, 130), in whole or in part. Examples of operations for handling authorization requests are described in further detail below.

In one or more embodiments, a policy management service 124 refers to hardware and/or software configured to perform operations described herein for receiving a policy statement and storing the policy statement in a syntax graph, for use by the authorization service 122. The policy management service 124 may be further configured to perform operations described herein for generating reader-friendly, localized policy statements. Examples of operations for receiving policy statements, generating syntax graphs, and generating reader-friendly, localized policy statements are described in further detail below.

In an embodiment, elements of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Policy Statement Management Architecture

Figure 2:
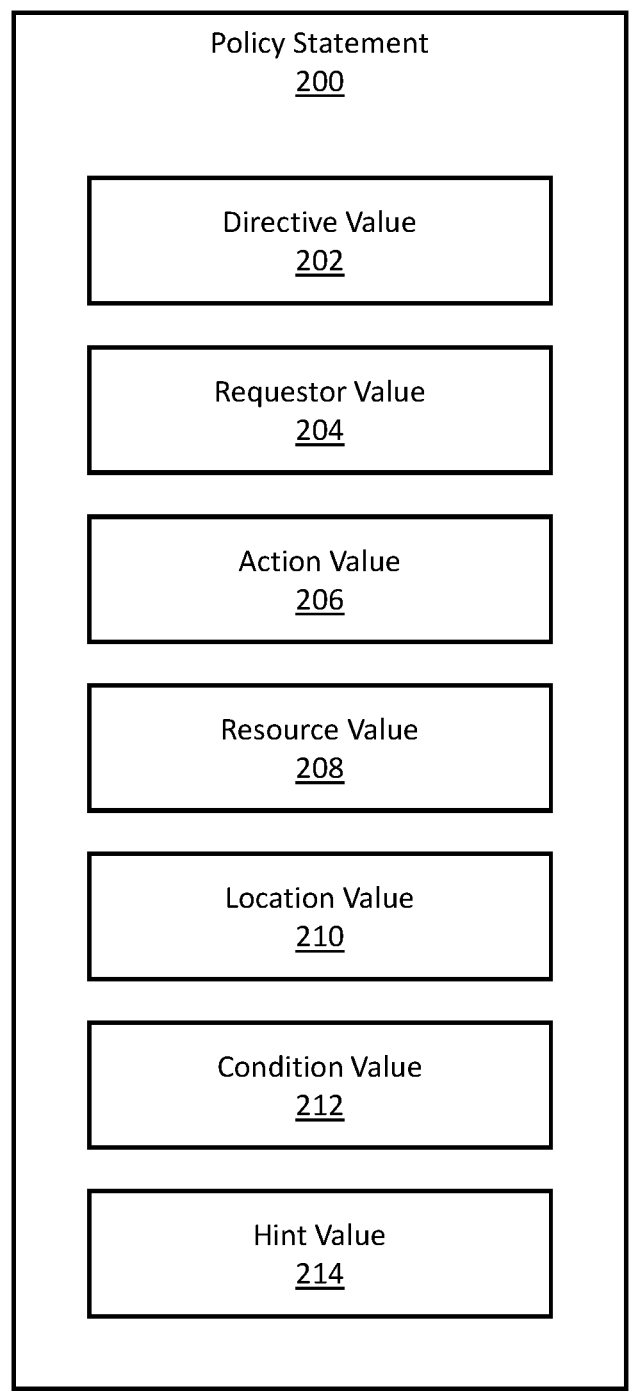
FIG. 2 shows a block diagram that illustrates a policy statement in accordance with one or more embodiments.

FIG. 2 illustrates a policy statement 200 in accordance with one or more embodiments. As illustrated in FIG. 2, the policy statement 200 includes values of multiple variables. Specifically, the policy statement 200 includes a directive value 202, a requestor value 204, an action value 206, a resource value 208, a location value 210, a condition value 212, and a hint value 214. The policy statement 200 may include more or fewer components than the components illustrated in FIG. 2. For example, a policy statement 200 may not include a condition value 212, a hint value 214, and/or one or more other variable values illustrated in FIG. 2.

In one or more embodiments, the policy statement 200 defines an authorization policy for a system 100. Specifically, the policy statement 200 indicates whether a particular requestor (indicated by a requestor value 204) is allowed to perform a particular action (indicated by an action value 206) on a particular resource (indicated by a resource value 208) in a particular location (indicated by a location value 210).

In one or more embodiments, a directive value 202 indicates whether the policy statement 200 is inclusive or exclusive. For example, a directive value of 'allow' may be used to indicate that authorization should be granted (i.e., an inclusive authorization policy) when the other elements of the policy statement 200 are satisfied. Alternatively, a directive value of 'deny' may be used to indicate that authorization should be denied (i.e., an exclusive authorization policy) when the other elements of the policy statement 200 are satisfied. The policy statement 200 may be assumed to be inclusive, in which case a directive 202 may not be required.

A directive 202 may nonetheless be included to make the policy statement 200 more reader-friendly.

In one or more embodiments, a requestor value 204 indicates a requestor for whom authorization is to be granted or denied. A requestor may be thought of as an actor or subject of the policy statement 200. Specifically, the requestor value 204 is used to designate a particular user or group of users for whom the policy statement 200 applies. For example, the requestor value 204 may be used to indicate that the policy statement 200 applies to a particular user, all users in a particular group (e.g., all administrators or all standard users), all users in all groups, or any other particular user or group of users. Multiple requestors may be indicated, for example, in a delimited list.

In one or more embodiments, an action value 206 indicates one or more actions that the requestor may attempt to perform. The action value 206 may be used to designate a single action. For example, an action value 206 of 'delete' may be used to indicate that the policy statement 200 applies to a requestor attempting to delete a resource. Alternatively or in addition, the action value 206 may be used to designate multiple actions, by listing each action individually or by using a generic term for a predefined list of actions. For example, an action value of 'manage' may be used as a generic term for a predefined list of actions that includes 'overwrite,' 'read,' 'delete,' 'create,' and 'inspect.' May different single actions and/or groups of actions may be referenced by an action value 206 in accordance with one or more embodiments. Multiple actions may be indicated, for example in a delimited list.

In one or more embodiments, a resource value 208 indicates one or more targets of the designated action. For example, the resource value 208 may refer to a file, a user profile, a network, a storage volume, or any other type of resource (or combination thereof), to which access can be managed using authorization policies. For example, the resource value 208 may include a particular username, file path, volume label, or other value identifying a particular resource.

In one or more embodiments, the resource value 208 indicates a resource or group of resources for which the action is either granted or denied. For example, a resource value 208 of 'all-groups' may be used to indicate that authorization should be granted or denied when a request is received to perform the action on any user group. As another example, a resource value 208 of 'volumes' may be used to indicate that authorization should be granted or denied when a request is received to perform the action on any storage volume. Many different resources and/or groups of resources may be referenced by a resource value 208 in accordance with one or more embodiments. Multiple resources may be indicated, for example in a delimited list. Further, a generic term (e.g., 'resources') may be used to indicate that the policy statement 200 applies to all resources in the designated location.

In one or more embodiments, a location value 210 indicates a location or group of locations for which the policy statement 200 applies. In general, a location value 210 may refer to any physical or logical separation of resources, or any group or combination thereof. For example, the location value 210 may refer to a particular tenancy in a cloud service, a particular zone or container in a virtualized environment, or a particular group or combination thereof. Multiple locations may be indicated, for example in a delimited list.

In one or more embodiments, a condition value 212 indicates a user-defined condition to be evaluated as part of the policy statement 200. For example, the condition may depend on a variable matching a particular string value, matching a particular pattern (e.g., a regular expression), having a particular numerical value, falling in a particular range of values, having a particular unique identity (e.g., a particular user identity, resource identity, or other unique identity), evaluating to a Boolean true or false, matching one of a list of values, or satisfying any other type of permissible user-defined condition in accordance with one or more embodiments.

In one or more embodiments, the user-defined condition is based on a user-defined variable and is different from any system-defined condition. For example, evaluating the current date and time may be considered a system-defined condition, because the date and time are values defined by the system. In contrast, comparing the value of a user-defined variable with a user-defined list of possible values may be considered a user-defined condition, because neither the variable nor the list of possible values are defined by the system. Many different types of user-defined conditions may be used that are different from any system-defined condition. Multiple user-defined conditions may be indicated, for example, in a delimited list. Further, user-defined conditions may be combined, for example, using the words 'and' and 'or.'

In one or more embodiments, elements of the policy statement 200 are presented using a particular syntax. The syntax may be localized, meaning that it is based on a vocabulary and one or more grammar rules of a human language. For example, English and French have different vocabularies. Further, nouns in French are gendered while nouns in English are neutral. For example, the English expression 'the chair' translates to the French expression 'la chaise.' Further, word order may differ between different localized syntaxes. In the English expression, "The man bit the dog," the verb (bit) comes before the object (the dog). In the German translation, "Der Mann hat den Hund gebissen," the verb (gebissen) comes after the object (den Hund). Many differences in vocabulary and grammar may be included in different localized syntaxes.

In one or more embodiments, a hint value 214 is used to embellish a localized syntax. A hint is a word that is not necessary to evaluate the policy statement 200, but included to help make the policy statement 200 more reader-friendly. For example, if the policy statement 200 is inclusive by default, then a directive 202 may not be strictly required. The word 'allow' may nonetheless be included in the policy statement 200 to help the policy statement 200 more closely resemble natural language. As another example, a hint may be a preposition that improves human readability of the policy statement 200. For example, in the expression 'allow administrators to delete files," the word 'to' improves readability but may not be strictly required to process the policy statement 200.

The following is an example of a policy statement in accordance with one or more embodiments: 'allow group A-Admins to manage all-resources in compartment Project-A.' This example includes a directive value of 'allow,' a requestor value of 'group A-Admins,' an action value of 'manage,' a resource value of 'all-resources,' and a location value of 'compartment Project-A.' This example further includes two hint values: 'to' and 'in.' This example does not include a user-defined condition. In this example, the policy statement indicates that any user in the group A-Admins is allowed to manage (a generic term for a predefined list of actions) any resource in the compartment called Project-A.

The following is another example of a policy statement in accordance with one or more embodiments: 'allow group GroupAdmins to delete users in tenancy where target.group.name!='Administrators."' This example includes a directive value of 'allow,' a requestor value of 'group GroupAdmins,' an action value of 'delete,' a resource value of 'users,' a location value of 'tenancy,' and a user-defined condition of 'where target.group.name!='Administrators". This example further includes two hint values: 'to' and 'in.' In this example, the policy statement indicates that any user in the group GroupAdmins is allowed to delete any user in the entire tenancy, as long as the user does not belong to the group called 'Administrators.'

Many different types of policy statements are possible in accordance with one or more embodiments.

4. Storing a User-Defined Policy Statement in a Syntax Graph

Figure 3A:
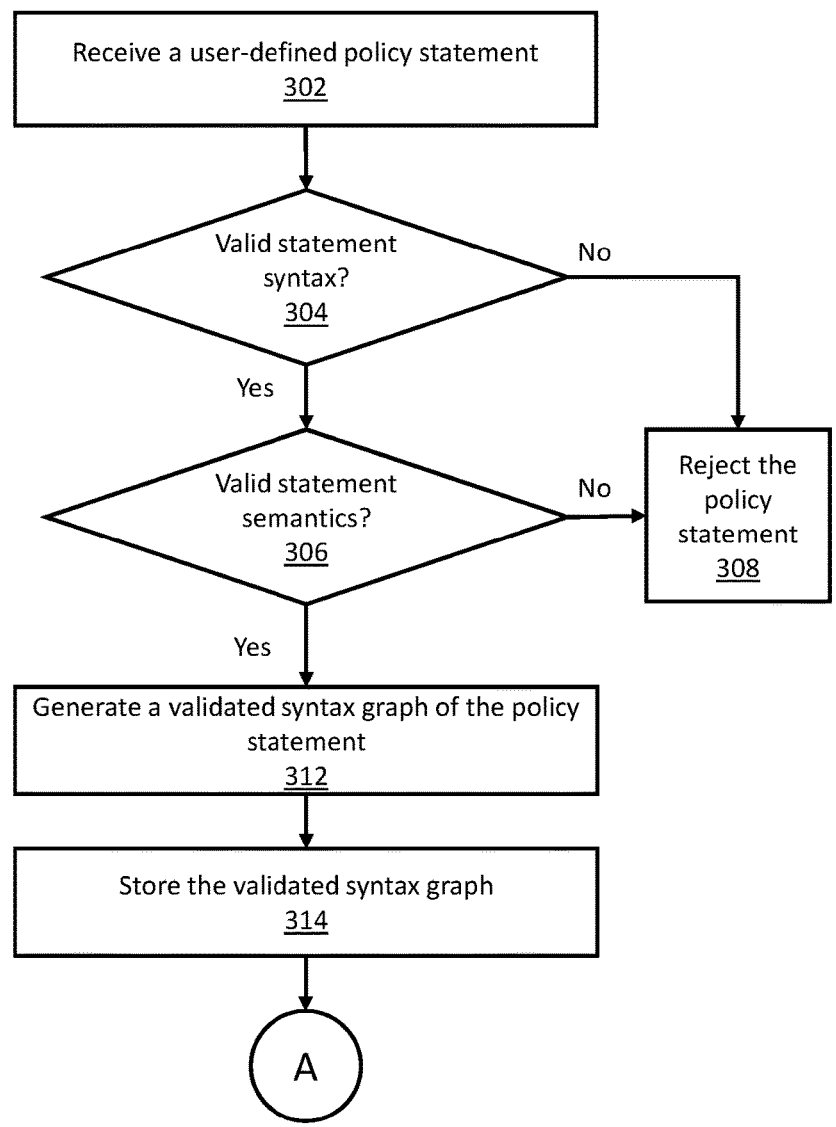
FIGS. 3A and 3B show a flowchart that illustrates an example set of operations for storing a user-defined policy statement in a syntax graph in accordance with one or more embodiments.
Figure 3B:
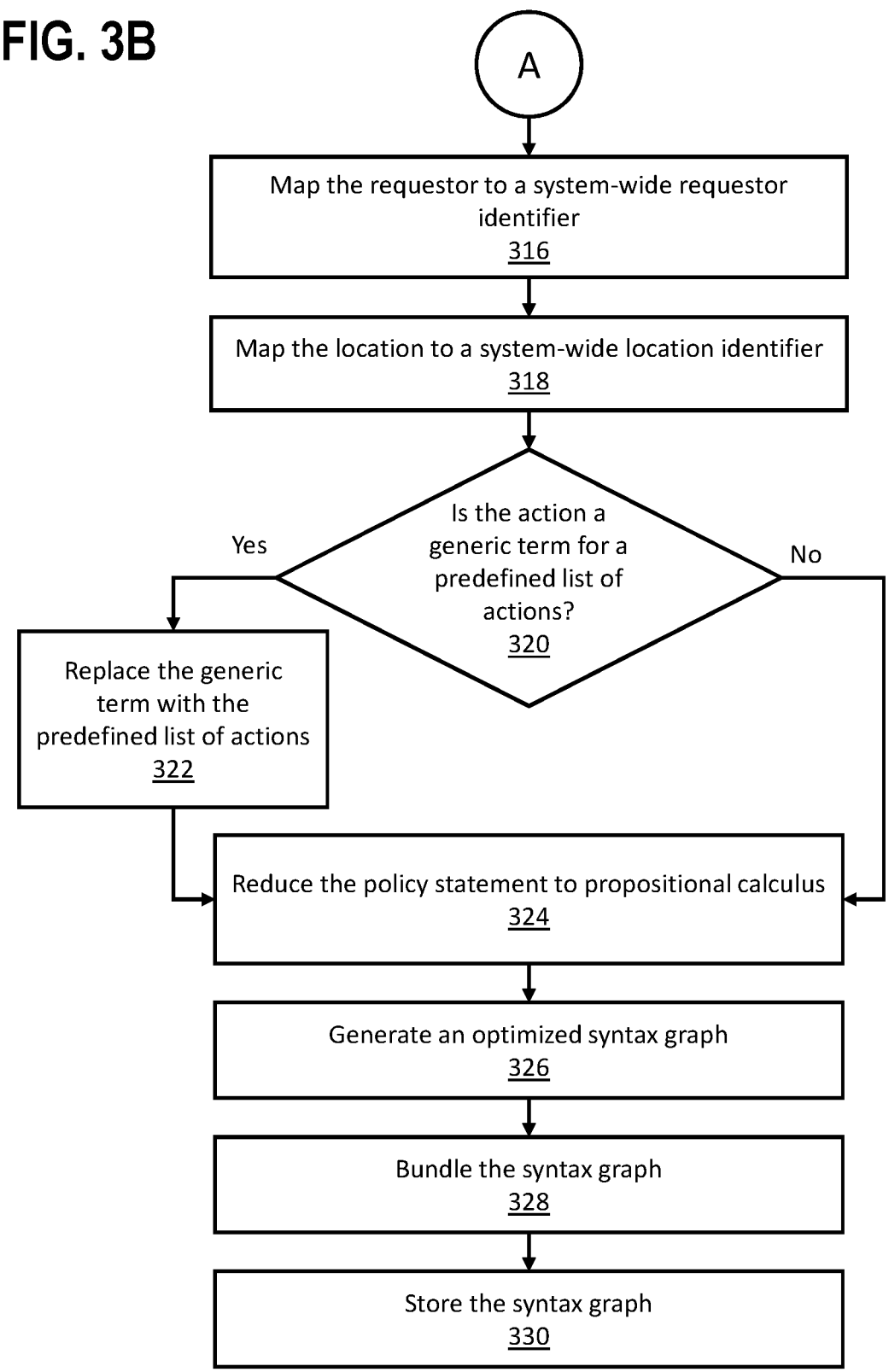

FIGS. 3A and 3B illustrate an example set of operations for storing a user-defined policy statement in a syntax-graph in accordance with one or more embodiments. One or more operations illustrated in FIGS. 3A and 3B may be modified, rearranged, or omitted all together. Accordingly, the particular sequence of operations illustrated in FIGS. 3A and 3B should not be construed as limiting the scope of one or more embodiments. In the following description, in accordance with one or more embodiments, the operations illustrated in FIGS. 3A and 3B are performed by a policy management service 124 as illustrated in FIG. 1. Alternatively or in addition, one or more of the operations illustrated in FIGS. 3A and 3B may be performed by an authorization service 122 and/or one or more other components that may or may not be illustrated in FIG. 1.

In one or more embodiments, the policy management service 124 receives a user-defined policy statement (Operation 302). The user-defined policy statement includes a requestor value, an action value, a resource value, and a location value, as described above. The policy statement may include additional values as described above, such as a directive, a user-defined condition, and/or a hint.

In one or more embodiments, the policy management service 124 validates the policy statement's syntax (Operation 304). If the policy statement's syntax is not valid, then the policy statement may be rejected (Operation 308). Validating the syntax involves determining whether values in the policy statement use a recognized vocabulary, are in a valid order, and/or satisfy certain grammar rules. For example, valid syntax may require that the policy statement begin with a directive. Alternatively or in addition, valid syntax may require that the action value belong to a predetermined, system-defined list of allowable action values. Further, the policy statement may be localized for a particular human language, and validating syntax may be based on a particular syntax defined for that particular human language.

In one or more embodiments, the policy management service 124 validates the policy statement's semantics (Operation 306). If the policy statement's semantics are not valid, then the policy statement may be rejected (Operation 308). Validating semantics involves determining whether the policy statement contains valid values for each element of the policy statement. A policy statement that has valid syntax may nonetheless have invalid semantics. For example, a policy statement may reference a type of resource that is not recognized by the system, which would make the policy statement unusable. As another example, the policy statement may reference a service (e.g., "allow service MyService to . . . ") where 'MyService' is subject to a lookup against a tenant-specific, dynamic whitelist but does not have a corresponding unique system-wide identifier. In this example, validating the policy statement's semantics may involve determining that the service 'MyService' is on the whitelist.

In one or more embodiments, validating semantics involves determining whether entities (e.g., requestors and/or locations) referenced in the policy statement can be mapped to unique, system-wide identifiers. For example, the policy management service 124 may determine whether a requestor value maps to a unique, system-wide requestor identifier. Alternatively or in addition, the policy management service 124 may determine whether a location value maps to a unique, system-wide location identifier. If an entity referenced in the policy statement contains a typographical error or is not in the proper format, it may not be possible to map the value to a unique, system-wide identifier.

In one or more embodiments, after determining that the policy statement is valid, the policy management service 124 generates a syntax graph of the policy statement (Operation 312), which may be thought of as a validated syntax graph. To generate the syntax graph, the policy management service 124 traverses the policy statement and generates a node for each element of the policy statement. For example, the policy management service 124 may generate separate nodes for each directive, requestor, action, resource, location, user-defined condition, and/or hint included in the policy statement.

In one or more embodiments, one or more elements included in the policy statement may not be included in the validated syntax graph. For example, as described below, it may not be necessary to generate nodes for directives. Further, because hints provide reader-friendly context but are not necessary to process the policy statement, the policy management service 124 may not generate nodes for hints. Further, syntax graphs generated by the policy management system 124 may be grouped by one or more elements of the policy statement. For example, the policy management system 124 may generate separate syntax graphs for each type of resource, each requestor (e.g., each user group), each location, or any other element or combination of elements. Accordingly, it may not be necessary for the policy management service 124 to generate nodes for elements that are implied by the syntax graph grouping.

In one or more embodiments, the policy management service 124 groups syntax graphs according to a combination of action and resource, which may together be referred to as a 'permission.' For example, a particular syntax graph may include policy statements for file management permissions. Syntax graphs grouped by permissions may include nodes for requestors, locations, and user-defined conditions, but not for actions or resources.

In one or more embodiments, the policy management service 124 generates the syntax graph by storing nodes in a particular hierarchy based on node type. For example, the syntax graph may have one or more levels of nodes identifying requestors, followed by child nodes identifying locations, followed by child nodes identifying user-defined conditions. The particular hierarchy of nodes may be based on the anticipated efficiency of the hierarchy. For example, it may be more efficient to determine whether a requestor is authorized to access a particular location before attempting to determine whether a user-defined condition is satisfied. Thus, syntax graph traversal may be performed depth-first to improve efficiency. However, different types of traversal algorithms may be used.

In one or more embodiments, the policy management service 124 generates the syntax graph so that the syntax graph is readily traversable to determine whether a particular authorization request satisfies one or more authorization policies stored in the syntax graph. Evaluating each node in the syntax graph may involve making a true/false determination. True/false determinations may include, for example: whether the requestor matches the requestor value stored in this node; whether the request is to access a resource in the location identified by this node; or whether a variable in the authorization request satisfies the user-defined condition identified by this node. Many different types of true/false determinations may be made.

In one or more embodiments, each node has up to two child nodes: one to traverse if the determination is false, and one to traverse if the determination is true. For purposes of explanation, these positions may be referred to as the left child ('false') and the right child ('true'). If the result of a node evaluation is 'false' and there is no left child, then authorization is denied, because there are no more conditions in which the authorization policy can be satisfied. If the result of a node evaluation is 'true' and there is no right child, then authorization is granted, because no more conditions need to be satisfied as part of the authorization policy.

In one or more embodiments, the policy management service 124 stores the validated syntax graph (Operation 314). The validated syntax graph is not yet ready to be used by an authorization service 122. However, the validated syntax graph may be used for other purposes. For example, the validated syntax graph may be used to generate a reader-friendly policy statement in a different localized syntax. Additional embodiments that involve generating reader-friendly policy statements in localized syntaxes are described below. The policy management service 124 may also store the original written policy statement, in addition to the syntax graph.

In one or more embodiments, the syntax graph stored at this point is an n-ary tree data structure with variable n values per level. In a system where multiple syntax graphs are used, the syntax graphs may be stored as a forest data structure of unbounded n-ary trees, or a disjoint union of tree data structures. Different data structures and combinations thereof may be used to store one or more syntax graphs.

In one or more embodiments, the policy management service 124 maps the requestor indicated by the policy statement to a unique system-wide requestor identifier. The unique system-wide requestor identifier may not be reader-friendly. The unique system-wide requestor identifier is a value that uniquely identifies a particular requestor (e.g., a particular user or user group) even when additional context is unavailable. For example, if two different tenancies have user groups with identical names, each of those user groups may have different system-wide identifiers. Thus, each of the user groups is distinguishable from the other by its unique system-wide identifier, even if the location is not known at the time the identifier is being evaluated.

In one or more embodiments, the policy management service 124 maps the location indicated by the policy statement to a unique system-wide location identifier. The unique system-wide location identifier may not be reader-friendly. The unique system-wide location identifier is a value that uniquely identifies a particular location (e.g., a particular container or tenancy) even when additional context is unavailable.

In one or more embodiments, the policy statement may include a generic term for a predefined list of actions. For example, an action value of 'manage' may be used as a generic term for a predefined list of actions that includes 'overwrite,' 'read,' 'delete,' 'create,' and 'inspect.' The policy management service 124 determines whether the action value is a generic term for a predefined list of actions (Operation 320). If yes, then the policy management service 124 replaces the generic term with the predefined list of actions (Operation 322).

In one or more embodiments, the policy management service 124 reduces the policy statement to a logic statement (Operation 324). The logic statement includes variables and logical operators. The logical operators may be similar to those used in propositional calculus. However, while it is common in propositional calculus to use single-character variables (e.g., constants A, B, and C and variables P, Q, and R), the variables used may be those included in the policy statement. Further, the logic statement may be generated using parentheticals, where each clause within a parenthetical represents a true statement. A policy statement reduced to a logic statement may be thought of as the 'canonical' version of the policy statement.

The following is an example in accordance with one or more embodiments. In this example, the policy management service 124 receives the following policy statement:

"allow group A to manage objects in compartment B"

This statement means that any user in group A should be allowed to manage (overwrite, read, delete, create action, and inspect) objects in compartment B. In this example, mapping the requestor value ("group A") and the location value ("compartment B") to unique system-wide identifiers results in the following:

"allow any {group id ocid1.group.dev..kslfkjsf3lkjlkj} to manage objects in compartment id ocid1.compartment.dev..dwelrkj13ljlkj34."

This version of the policy statement still includes the generic term 'manage.' In this example, replacing the generic term with the predefined list of actions results in the following:

"allow any {group id ocid1.group.dev..kslfkjsf3lkjlkj} to any {OBJECT_OVERWRITE, OBJECT_READ, OBJECT_ DELETE, OBJECT_CREATE, OBJECT_IN-SPECT} in compartment id ocid1.compartment.dev..dwelrkj13ljlkj34."

Then, in this example, reducing the policy statement to a logic statement results in the following:

"((val(request.groups.id)≅
'ocid1.group.dev..kslfkjsf3lkjlkj')∧((permission
⇒OBJECT_OVERWRITE)∨(permission⇒OBJEC-
T_READ)∨(permission⇒OBJECT_DELETE)∨(permission⇒OBJECT_CREATE)∨(permission⇒OBJECT_IN-
SPECT))∧(val(target.compartment.id)≅
'ocid1.compartment.dev..dwelrkj13ljlkj34'))

In one or more embodiments, the logic statement may include additional information (not shown in this example) about the policy statement, such as the interface through which it was created (e.g., a webpage, interactive console, etc.), who created it, and other types of information that may be used to provide context, for auditing, etc.

In one or more embodiments, the policy management service 124 generates an optimized syntax graph from the canonical policy statement (Operation 326). Optimizing the syntax graph may involve identifying duplicate nodes and eliminating one or more of the duplicate nodes, to reduce redundancy in the syntax graph. Alternatively or in addition, optimizing the syntax graph may involve eliminating a path in the syntax graph that is non-viable, i.e., where there are no conditions that can satisfy the authorization policy. The resulting syntax graph may be a reduced ordered binary decision diagram.

In one or more embodiments, the policy management service 124 bundles the syntax graph (Operation 328) and stores the syntax graph (Operation 330). In one or more embodiments, bundling the syntax graph involves storing the syntax graph in a data structure that is suitable for transmission to an authorization service 122. For example, the syntax graph may be stored in a JavaScript Object Notation (JSON) object, compressed, or otherwise bundled for storage. Storing the syntax graph (i.e., Operation 330) may involve 'pushing' the bundled syntax graph out to a distributed system, making the syntax graph more readily available for use by one or more distributed instances of the authorization service 122.

In one or more embodiments, storing policy statements in syntax graphs improves performance of a system by providing an efficient storage mechanism for authorization policies. It may be efficient, for example, to synchronize syntax graphs across redundant locations in a cloud service. Further, syntax graphs provide an efficient way to evaluate authorization policies in response to authorization requests. Further, syntax graphs provide flexibility to combine multiple authorization policies into a single graph. A multi-policy syntax graph may be optimized to eliminate redundancies and/or non-viable paths, thus reducing the system overhead associated with storing and using multiple authorization policies. As the number of authorization policies in a system grows, and as the number of authorization requests in the system grows, the benefits of this approach in terms of improving the system's operation increase accordingly.

5. Example Embodiments of Syntax Graphs

Figure 4:
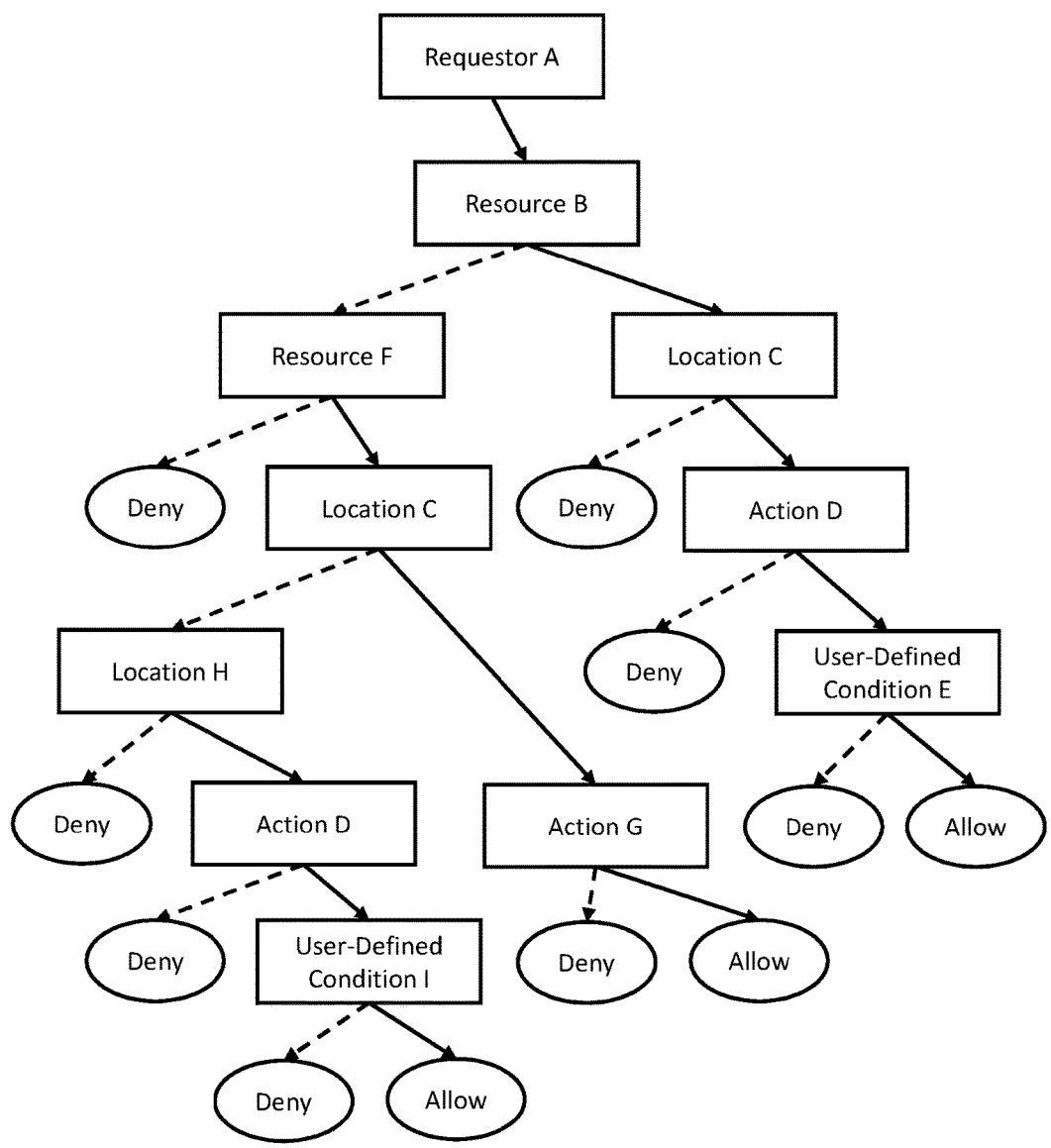
FIGS. 4 through 6 show block diagrams that illustrate examples of syntax graphs in accordance with one or more embodiments.

FIG. 4 illustrates an example of a syntax graph 400 in accordance with one or more embodiments. In this example, the syntax graph 400 includes nodes corresponding to a requestor, multiple resources, multiple locations, multiple actions, multipole user-defined conditions, and multiple directives. The nodes are stored hierarchically in the order just listed. However, as discussed above, one or more types of nodes may not be used or needed. Accordingly, the example shown in FIG. 4 should not be considered as limiting the scope of one or more embodiments.

In the example illustrated in FIG. 4, a left child is traversed if its parent node evaluates as false, and a right child is traversed if its parent node evaluates as true. Thus, to generate a response to an authorization request, the syntax graph 400 would be traversed as follows. First, determine whether the requestor is Requestor A. If not, then the request is denied because there is no left child. That is, there is no other condition that satisfies the policy statement(s) included in the syntax graph. Next, determine whether the request is to perform an action on Resource B. If not, then determine whether the request is to perform an action on Resource F. If not, then deny the request.

If the request is to perform an action on Resource F, then determine whether the request is to perform the action in location C. If not, then determine whether the request is to perform an action in Location H. If not, then deny the request. If the request is to perform an action in Location H, then determine whether the request is to perform Action D. If not, then deny the request. If the request is to perform Action D, then determine whether User-Defined Condition I is satisfied. If not, then deny the request. If yes, then allow the request.

If the request is to perform an action on Resource F in Location C, then determine whether the request is to perform Action G. If not, then deny the request. If yes, then allow the request.

If the request is to perform an action on Resource B, then determine whether the request is to perform an action in Location C. If not, then deny the request. If yes, then determine whether the request is to perform Action D. If not, then deny the request. If yes, then determine whether User-Defined Condition E is satisfied. If not, then deny the request. If yes, then allow the request.

In this example, the syntax graph is not optimized, because there are duplicate nodes that could possibly be eliminated. For example, there are two nodes referencing Location C and two nodes referencing Action D.

Further, in this example, each user-defined condition is represented as a single node. In one or more embodiments, a user-defined condition may also be represented as multiple nodes. For example, a user-defined condition may include multiple variables to be evaluated, and each of those evaluations may be represented as one or more separate nodes in the syntax graph.

Figure 5A:
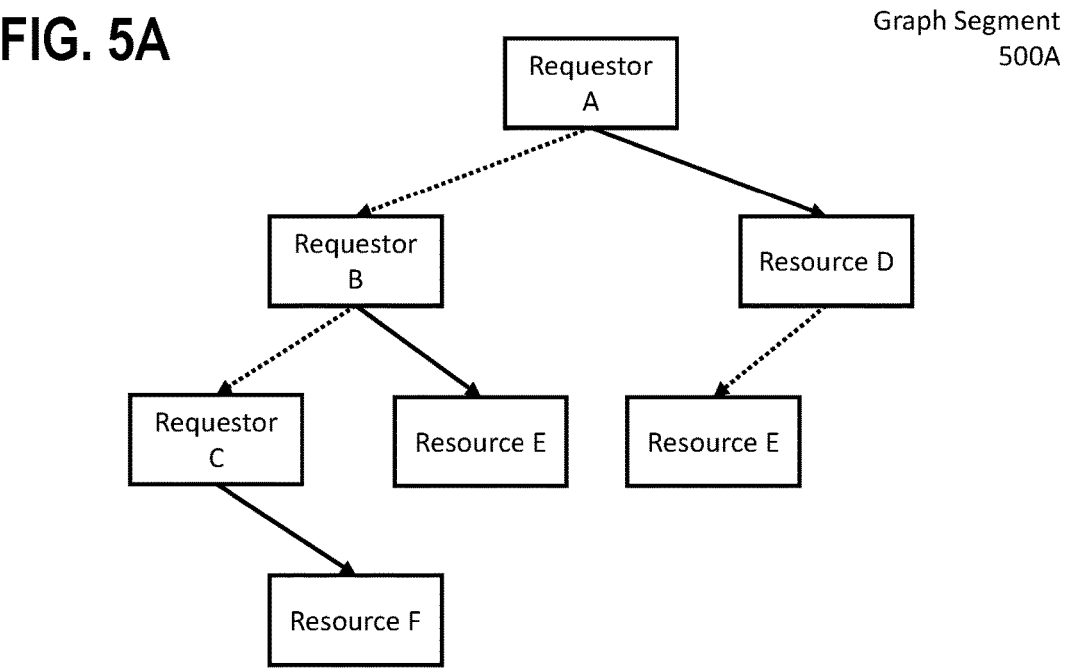
Figure 5B:
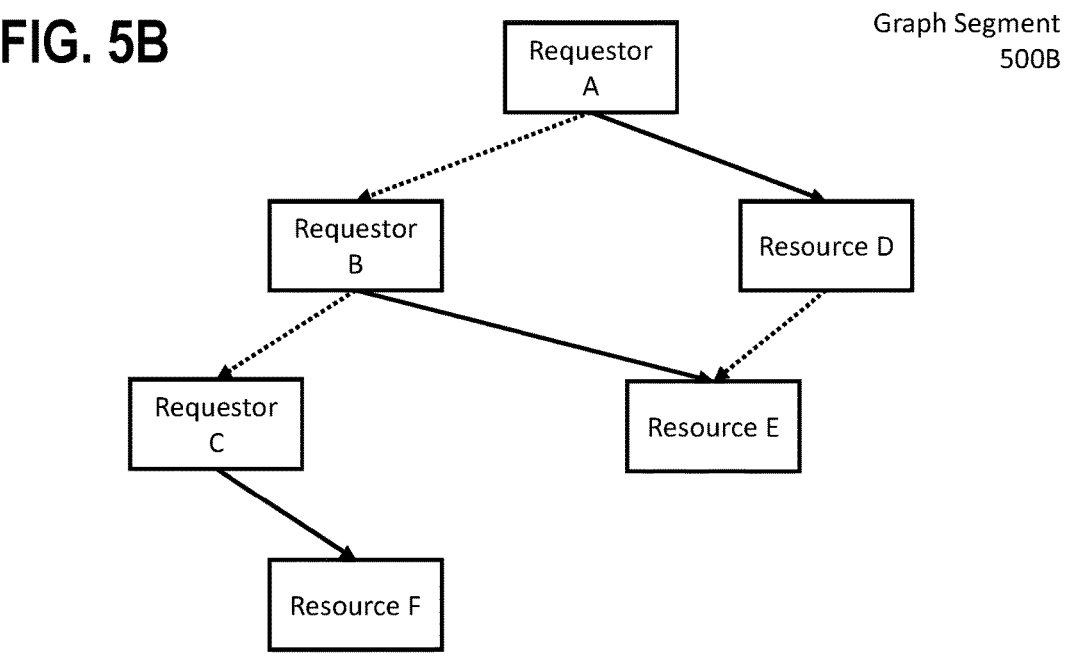

FIG. 5A illustrates an example of a graph segment 500A in accordance with one or more embodiments. In this example, there are nodes only for requestors and resources. Further, the graph segment 500A includes duplicate nodes for Resource E. FIG. 5B illustrates an example of a graph segment 500B in accordance with one or more embodiments, which is identical to graph segment 500A except that a duplicate node has been eliminated. When traversing graph segment 500B, if an authorization request is for Requestor B, then graph traversal proceeds to the same node as if the request were for Requestor A and not for Resource D. Optimizing a graph segment in this manner may reduce overhead associated with storing and processing syntax graphs, particularly as the number of authorization policies increases.

In one or more embodiments, a syntax graph such as the syntax graph 500B illustrated in FIG. 5B may be used to generate a list of system permissions upon request. In one or more embodiments, the request may be fairly specific. For example, using the syntax graph 500B, it would be possible to answer the question, "Who is allowed to perform actions on Resource E?" Traversing the syntax graph from the bottom up reveals that the answer is "Requestor A and Requestor B." If a syntax graph includes user-defined conditions, it may be possible to generate a list of permissions that are available when particular user-defined conditions are satisfied. A syntax graph may be used to obtain many different types of information about permissions in a system. The policy management service 124 illustrated in FIG. 1 may be configured to provide these kinds of answers in response to user requests.

Figure 6:
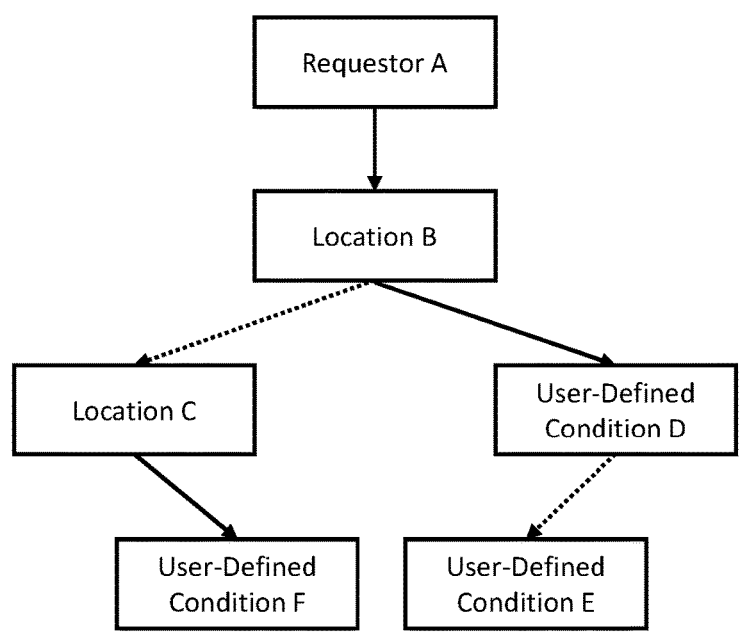

FIG. 6 illustrates an example of a syntax graph 600 in accordance with one or more embodiments. In this example, syntax graphs are grouped by permission, as discussed in further detail above. Therefore, the syntax graph 600 include nodes for requestors, locations, and user-defined conditions, but not for actions or resources. Other syntax graph groupings may be used.

6. Storing a Multi-Policy Syntax Graph

Figure 7:
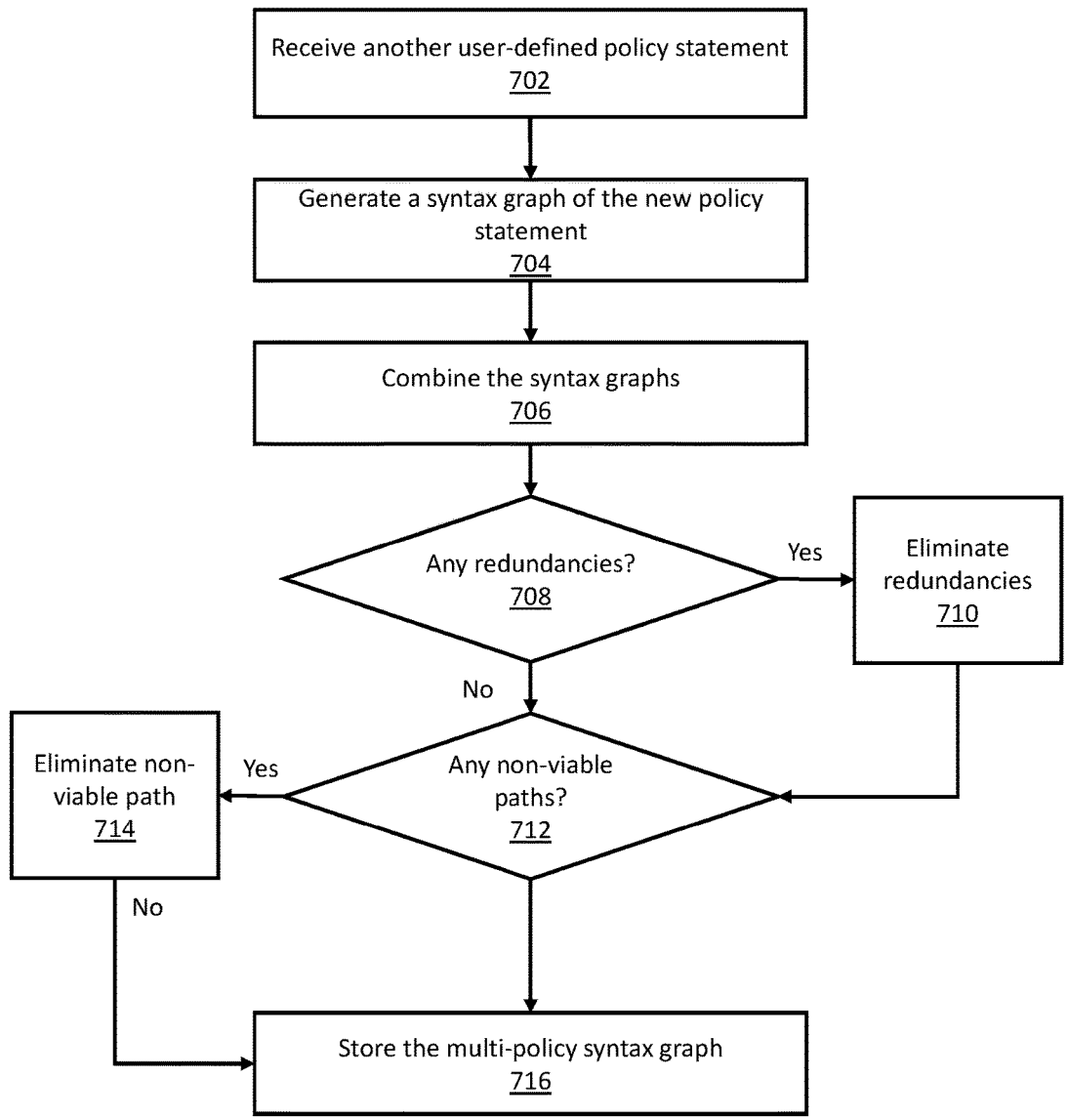
FIG. 7 shows a flowchart that illustrates an example set of operations for storing multiple user-defined policy statements in a multi-policy syntax graph in accordance with one or more embodiments.

FIG. 7 illustrates an example set of operations for storing a multi-policy syntax graph in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. In the following description, in accordance with one or more embodiments, the operations illustrated in FIG. 7 are performed by a policy management service 124 as illustrated in FIG. 1. Alternatively or in addition, one or more of the operations illustrated in FIG. 7 may be performed by an authorization service 122 and/or one or more other components that may or may not be illustrated in FIG. 1.

In one or more embodiments, when the operations illustrated in FIG. 7 begin, a particular user-defined policy statement has already been stored in a syntax graph. The policy management service 124 receives another user-defined policy statement (Operation 702) and generates a syntax graph of the new policy statement (Operation 704). Generating a syntax graph of the new policy statement may involve operations described above. The policy management service 124 combines the syntax graphs, i.e., the syntax graph for the first policy statement and the syntax graph for the new policy statement, to obtain a multi-policy syntax graph.

In one or more embodiments, the policy management service 124 optimizes the multi-policy syntax graph. The policy management service may determine whether there are any redundancies, i.e., duplicate nodes that can be removed (Operation 708). If there are redundancies, then the policy management service 124 may eliminate the redundancies, i.e., eliminates duplicate nodes where possible. The policy management service 124 may determine whether there are any non-viable paths (i.e., traversable segments) of the syntax graph, meaning paths that cannot possibly result in allowing an authorization request (Operation 712). If there is a non-viable path, then the policy management service 124 may eliminate the non-viable path (Operation 714).

In one or more embodiments, the policy management service 124 stores the multi-policy syntax graph (Operation 716). Storing the multi-policy syntax graph may involve first bundling the multi-policy syntax graph. Further, storing the multi-policy syntax graph may involve 'pushing' the multi-policy syntax graph out to a distributed system, making the multi-policy syntax graph more readily available for use by one or more distributed instances of the authorization service 122. Storing the multi-policy syntax graph may involve replacing or overwriting a prior syntax graph, i.e., a version that does not incorporate the new policy statement.

As an example of a multi-policy syntax graph, consider the syntax graph 600 illustrated in FIG. 6. In one or more embodiments, the syntax graph 600 may be the result of combining two policy statements (assuming for the sake of this example that the syntax graph is associated with the permission 'manage objects'), to wit:

'allow Requestor A to manage objects in location B, location C where User-Defined-Condition-F'

'allow Requestor A to manage objects in location B {where User-Defined-Condition-D, User-Defined-Condition-E}'

Because both policy statements are for Requestor A and include a viable path for objects in Location B, the syntax graph 600 is optimized so that those nodes each are represented only once in the syntax graph 600.

7. Authorization Request Handling Architecture

Figure 8:
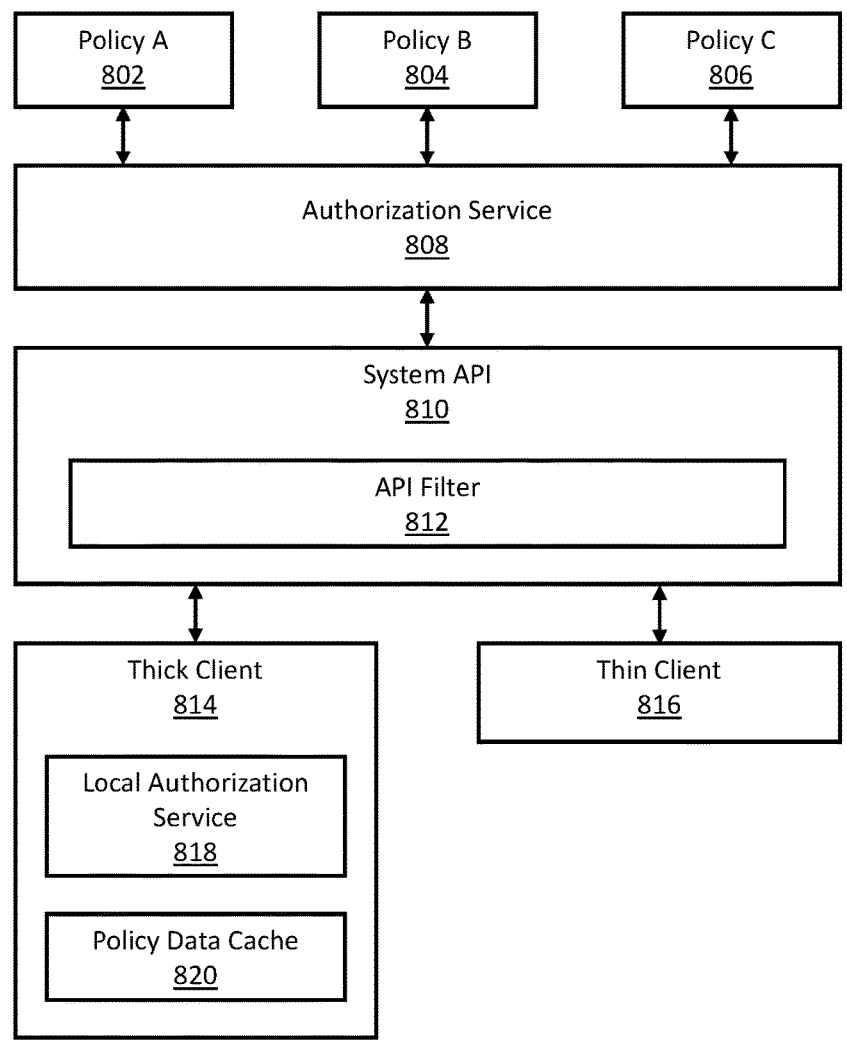
FIG. 8 shows a block diagram that illustrates a system in accordance with one or more embodiments.

FIG. 8 illustrates a system 800 in accordance with one or more embodiments. As illustrated in FIG. 8, the system 800 includes a thick client 814, a thin client 816, a system API 810, an authorization service 808, and multiple authorization policies 802, 804, 806. The system 800 may include more or fewer components than the components illustrated in FIG. 8. The components illustrated in FIG. 8 may be local to or remote from each other. The components illustrated in FIG. 8 may be implemented in software and/or hardware. Each component may be distributed over multiple applications and/or machines. Multiple components may be combined into one application and/or machine. Operations described with respect to one component may instead be performed by another component.

In one or more embodiments, the system 800 illustrated in FIG. 8 is an elaboration upon components of the system 100 illustrated in FIG. 1 that are used for handling authorization requests. Specifically, the thick client 814 and the thin client 816 may be similar or equivalent to one or more clients illustrated in FIG. 1. The system API 810 may be similar or equivalent to the system API 120 illustrated in FIG. 1. The authorization service 808 may be similar or equivalent to the authorization service 122 illustrated in FIG. 1.

In the system 800 illustrated in FIG. 8, there are two types of clients: a thick client 814 and a thin client 816. The thick client includes a local authorization service 818 and a policy data cache 820. The thick client 814 is configured to use the local authorization service 818 and the policy data cache 820 to perform operations for caching policy data. Examples of operations for caching policy data are described in further detail below. In contrast, the thin client 816 lacks the ability to perform one or more of these operations. Specifically, the thin client 816 may need to rely on the authorization service 808 for all authorization results, both preliminary and final.

In one or more embodiments, the system API 810 includes a system filter 812. The system API 810 is configured to use the API filter 812 to perform operations for obtaining preliminary authorization responses. Examples of operations for obtaining preliminary authorization responses are described in further detail below.

In one or more embodiments, the authorization service 808 is configured to use multiple authorization policies (e.g., 802, 804, 806) to perform operations for generating final authorization results. Examples of operations for generating final authorization results are described in further detail below.

8. Policy Data Cache Architecture

Figure 9:
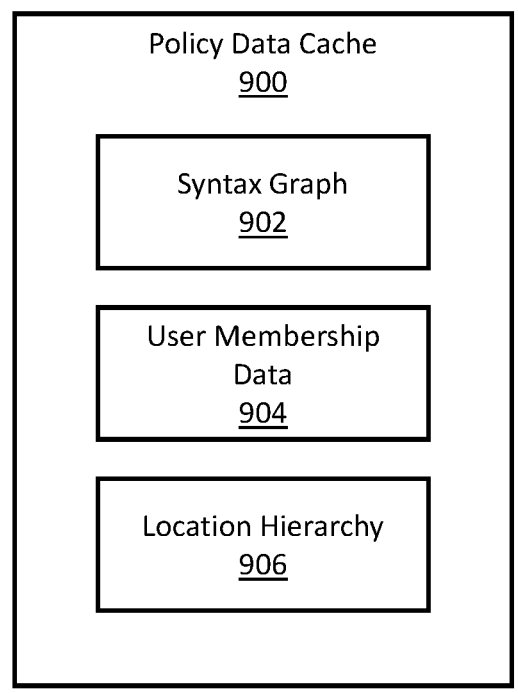
FIG. 9 shows a block diagram that illustrates a policy data cache in accordance with one or more embodiments.

FIG. 9 illustrates a policy data cache 900 in accordance with one or more embodiments. As illustrated in FIG. 9, the policy data cache 900 includes a syntax graph 902, user membership data 904, and a location hierarchy 906. The policy data cache 900 may include more or fewer components than the components illustrated in FIG. 9.

In one or more embodiments, the syntax graph 902 includes some or all of one or more authorization policies, stored in syntax graphs. The thick client 814 illustrated in FIG. 8 may be configured to use the syntax graph 902 to process authorization requests, reducing the need for the thick client 814 to contact the authorization service 808 via the system API 810.

In one or more embodiments, the user membership data 904 describes group membership of one or more users of the system 800. The thick client 814 may be configured to use the user membership data 904 in combination with the syntax graph 902 to process authorization requests.

In one or more embodiments, the location hierarchy 906 includes information about the relative locations of resources. The thick client 814 may be configured to use the location hierarchy 906 in combination with the syntax graph 902 to process authorization requests.

In one or more embodiments, the system API 810 illustrated in FIG. 8 is configured to receive some or all of the syntax graph 902, user membership data 904, and/or location hierarchy 906 from the authorization service 808 and provide it to the thick client 814.

9. Using a Policy Data Cache

Figure 10A:
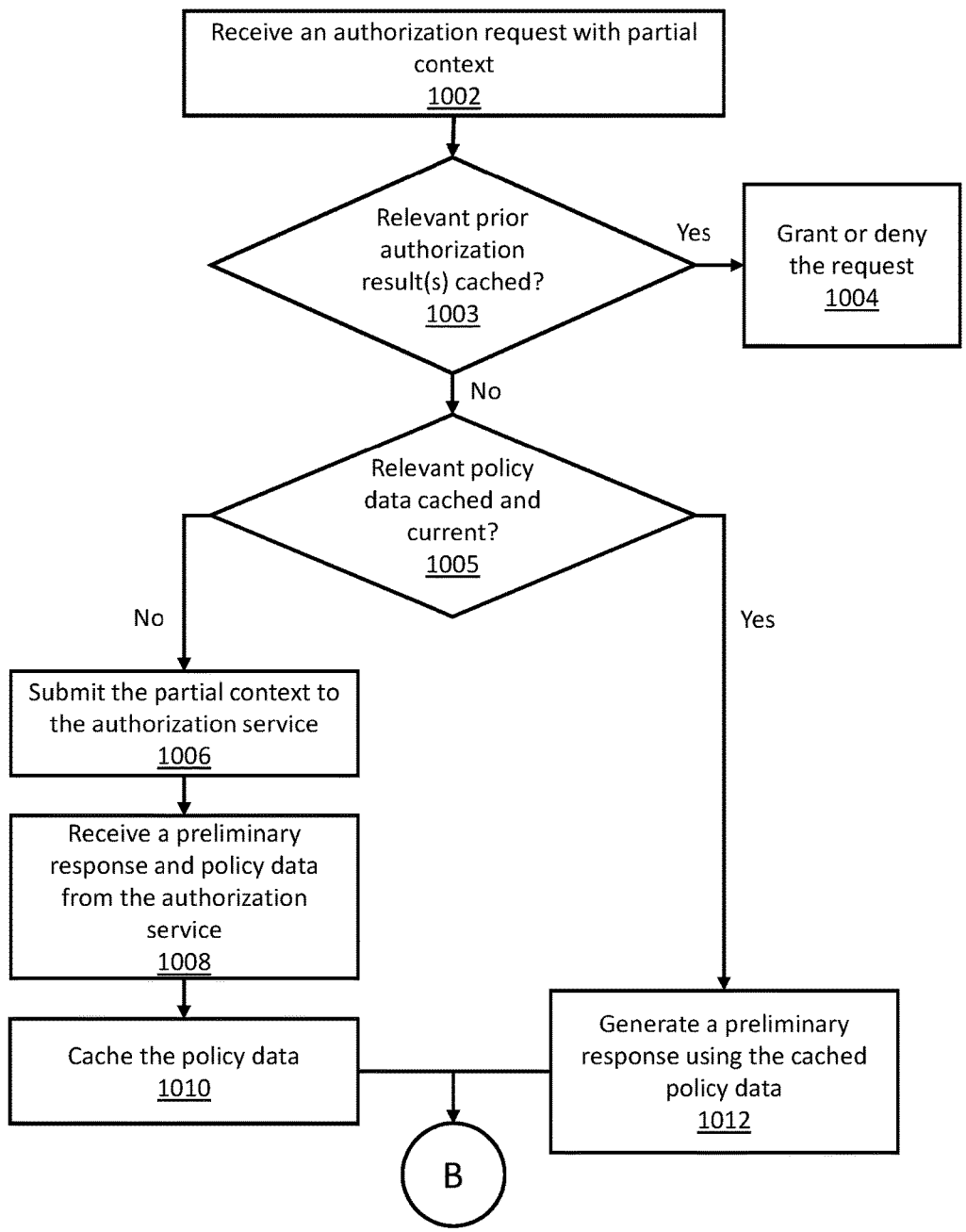
FIGS. 10A and 10B show a flowchart that illustrates an example set of operations for using a policy data cache in accordance with one or more embodiments.
Figure 10B:
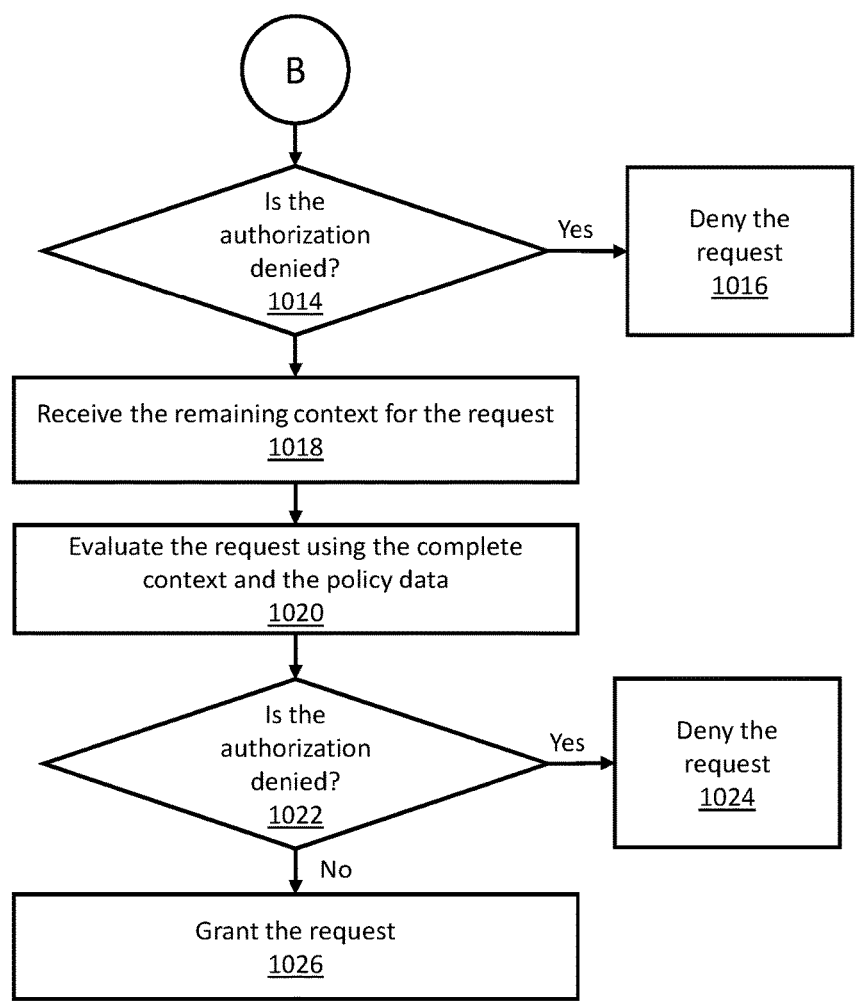

FIGS. 10A and 10B illustrate an example set of operations for using a policy data cache in accordance with one or more embodiments. One or more operations illustrated in FIGS. 10A and 10B may be modified, rearranged, or omitted all together. Accordingly, the particular sequence of operations illustrated in FIGS. 10A and 10B should not be construed as limiting the scope of one or more embodiments. In the following description, in accordance with one or more embodiments, the operations illustrated in FIGS. 10A and 10B are performed by a local authorization service 818 of a thick client 814 as illustrated in FIG. 8. Alternatively or in addition, one or more of the operations illustrated in FIGS. 10A and 10B may be performed by other components.

In one or more embodiments, the local authorization service 818 receives an authorization request (Operation 1002). At this point, only partial context is available for the authorization request. For example, the action to be performed and the type of resource on which the action is to be performed may be known, and the specific requestor and location of the resource may not be known yet. The type of resource may be known, for example, by virtue of the identity of an API call being made, if the API call is for performing actions on a particular type of resource.

In one or more embodiments, the local authorization service 818 determines whether a relevant prior authorization result has been cached (Operation 1003). For example, if a similar authorization request was previously processed, the local authorization service 818 may have cached the final result of that authorization request.

If a relevant prior authorization result has been cached, then the local authorization service 818 may grant or deny the request based on the prior result (Operation 1004). Further, multiple prior authorization results may be combined to determine whether to grant or deny the request. In other words, while information from one prior authorization result may not be sufficient make the determination, information from multiple prior authorization results may be sufficient. For example, one prior authorization result may indicate that the requestor is allowed to read a particular type of resource, and another prior authorization result may indicate that the requestor is allowed to write that type of resource. Combining these two prior authorization results, the same requestor may be allowed to copy that type of resource, which involves both reading and writing.

In one or more embodiments, upon determining that a relevant prior authorization result is cached (i.e., Operation 1003), the local authorization service 818 waits for additional contextual information associated with the authorization request before determining whether to grant or deny the request (i.e., Operation 1004). For example, the local authorization service 818 may wait until the requestor, action, resource, and location are all known. Alternatively or in addition, the local authorization service 818 may wait until the value of a variable needed to evaluate a user-defined condition is known.

In one or more embodiments, if the local authorization service 818 does not attempt or is unable to grant or deny the request based on a cached prior authorization result, then the local authorization service 818 determines whether relevant policy data is cached in the policy data cache (Operation 1005). If policy data is cached, the local authorization service 818 may also determine whether the policy data is current. That is, the policy data, user membership data, and/or location hierarchy may have one or more associated expiration timer(s), and may not be useable by the local authorization service 818 once the timer(s) have expired.

In one or more embodiments, if relevant policy data is not cached, then the local authorization service 818 submits the partial contextual information associated with the authorization request to the authorization service 808 via the system API 810 (Operation 1006). Calls to the system API 810 may initially be processed by an API filter 812. The API filter 812 may be configured to perform initial processing on calls to the system API 810 before invoking the underlying API code. For example, if the system API 810 is implemented in a Java programming language, the API filter 812 may be a Java Servlet Filter. The API filter 812 may transmit the partial contextual information to the authorization service 808 before invoking the underlying API code.

In one or more embodiments, the authorization service 808 uses the partial contextual information to generate a preliminary authorization response. The preliminary authorization response may be a denial or a non-denial. A denial may occur when the partial contextual information is sufficient to determine that the authorization request cannot possibly be granted, even with more contextual information. For example, if the partial contextual information includes an action to be performed, and the authorization service 808 does not have any authorization policies allowing that action, then a denial is appropriate. A non-denial means that the authorization request may be granted but additional contextual information is needed before making a final determination.

In one or more embodiments, the local authorization service 818 receives the preliminary authorization response from the authorization service 808, via the system API 810, in response to the partial contextual information (Operation 1008). The local authorization service 818 may also receive policy data from the authorization service 808, via the system API 810, in response to the partial contextual information. The policy data includes one or more syntax graphs describing one or more authorization policies, or a portion thereof. The policy data may also include user membership data and/or a location hierarchy. Policy data may be received only if the preliminary authorization response is a non-denial. Alternatively, policy data may be received even if the preliminary authorization response is a denial. In one or more embodiments, the local authorization service 818 caches the policy data for subsequent use (Operation 1010). The policy data may be used for further processing of the current authorization request and/or to process a later authorization request.

In one or more embodiments, if the local authorization service 818 already has cached relevant policy data that has not expired (i.e., as determined in Operation 1005), then the local authorization service 818 may use the cached policy data to generate a preliminary authorization response, without needing to call the authorization service.

In one or more embodiments, the local authorization service 818 determines whether the preliminary authorization response (i.e., as received from the authorization service 808 in Operation 1008 or through local processing in Operation 1012) is a denial (Operation 1014). If the preliminary authorization response is a denial, then the local authorization service 818 denies the authorization request (Operation 1016). In addition, if the preliminary authorization response is a denial, then the local authorization service 818 may refrain from processing additional contextual information associated with the authorization request, because the additional contextual information cannot change the outcome of the authorization.

In one or more embodiments, obtaining an initial authorization response in this manner improves system performance by reducing the amount of network activity and/or processing cycles needed to obtain a final authorization result. Specifically, if the initial authorization response is a denial, then it may not be necessary to obtain and/or further process the complete contextual information associated with the authorization request. As the number of authorization requests increases, the benefits to the system's operation of obtaining preliminary authorization responses may be substantial.

In one or more embodiments, if the preliminary authorization response is a non-denial, then the local authorization service 818 receives the remaining contextual information associated with the authorization request (Operation 1018). The local authorization service 818 then evaluates the authorization request using the complete contextual information and the cached policy data (Operation 1020). Because the policy data is cached by the local authorization service 818, an additional call to the authorization service 808 is not required.

In one or more embodiments, the local authorization service 818 uses a syntax graph, group membership data, and/or a location hierarchy to evaluate the authorization request. For example, the syntax graph may describe an authorization policy for all users in a particular user group to perform an action, and the group membership data may describe which users belong to that user group. Thus, the syntax graph and group membership data may be used together to determine whether a particular user has authorization to perform the action. As another example, the syntax graph may describe an authorization policy for performing an action in a particular location, and the location hierarchy may indicate which locations are 'child' locations within that particular location. Thus, the syntax graph and the location hierarchy may be used together to determine whether to authorize the action in a particular child location of the location specified in the authorization policy.

Alternatively, if the policy data cache doesn't have sufficient information to make a final authorization determination based on the complete contextual information, then the local authorization service 818 may submit the complete contextual information to the authorization service 808 to obtain the final authorization result.

In one or more embodiments, the local authorization service 818 determines whether the final authorization result is a denial (Operation 1022). If the final authorization result is a denial, then the local authorization service denies the request (Operation 1024). Otherwise, the local authorization service grants the request (Operation 1026).

In one or more embodiments, using the policy data cache to generate preliminary authorization responses and/or final authorization results saves system resources (e.g., network bandwidth and/or processing cycles), by reducing the number of calls to the authorization service 808 needed to process the authorization request. As the number of authorization requests occurring in a given system increases, the system resources saved in this manner, and corresponding improvements to the system's operation, may be substantial.

10. Localizing Policy Statements

In one or more embodiments, an authorization statement used to generate and store a syntax graph is initially prepared in a reader-friendly, localized syntax. Localization means that the policy statement uses a vocabulary and one or more grammar rules of a human language. For example, English and French have different vocabularies. Further, nouns in French are gendered while nouns in English are neutral. For example, the English expression 'the chair' translates to the French expression 'la chaise.' Further, word order may differ between different localized syntaxes. In the English expression, "The man bit the dog," the verb (bit) comes before the object (the dog). In the German translation, "Der Mann hat den Hund gebissen," the verb (gebissen) comes after the object (den Hund). Many differences in vocabulary and grammar may be included in different localized syntaxes. A particular localized syntax may not include all the vocabulary and grammar rules of the corresponding human language.

In one or more embodiments, reader-friendly means that the policy statement is written or presented in a way that is readily understandable to an reasonably skilled human reader. When a policy statement references a unique system-wide identifier, a reader-friendly substitute may be used, instead of the full identifier. For example, a user group may have a unique system-wide identifier of 'ocid1.group.dev..kslfkjsf3lkjlkj' and a reader-friendly substitute of 'Group A.' Using a localized syntax makes the policy statement more reader-friendly, because the policy statement more closely approximates the particular human language for which the localized syntax is designed. Reader-friendliness of the policy statement may be further improved by allowing hints, i.e., words that are not necessary to interpret the policy statement but provide additional context to improve human readability.

Figure 11:
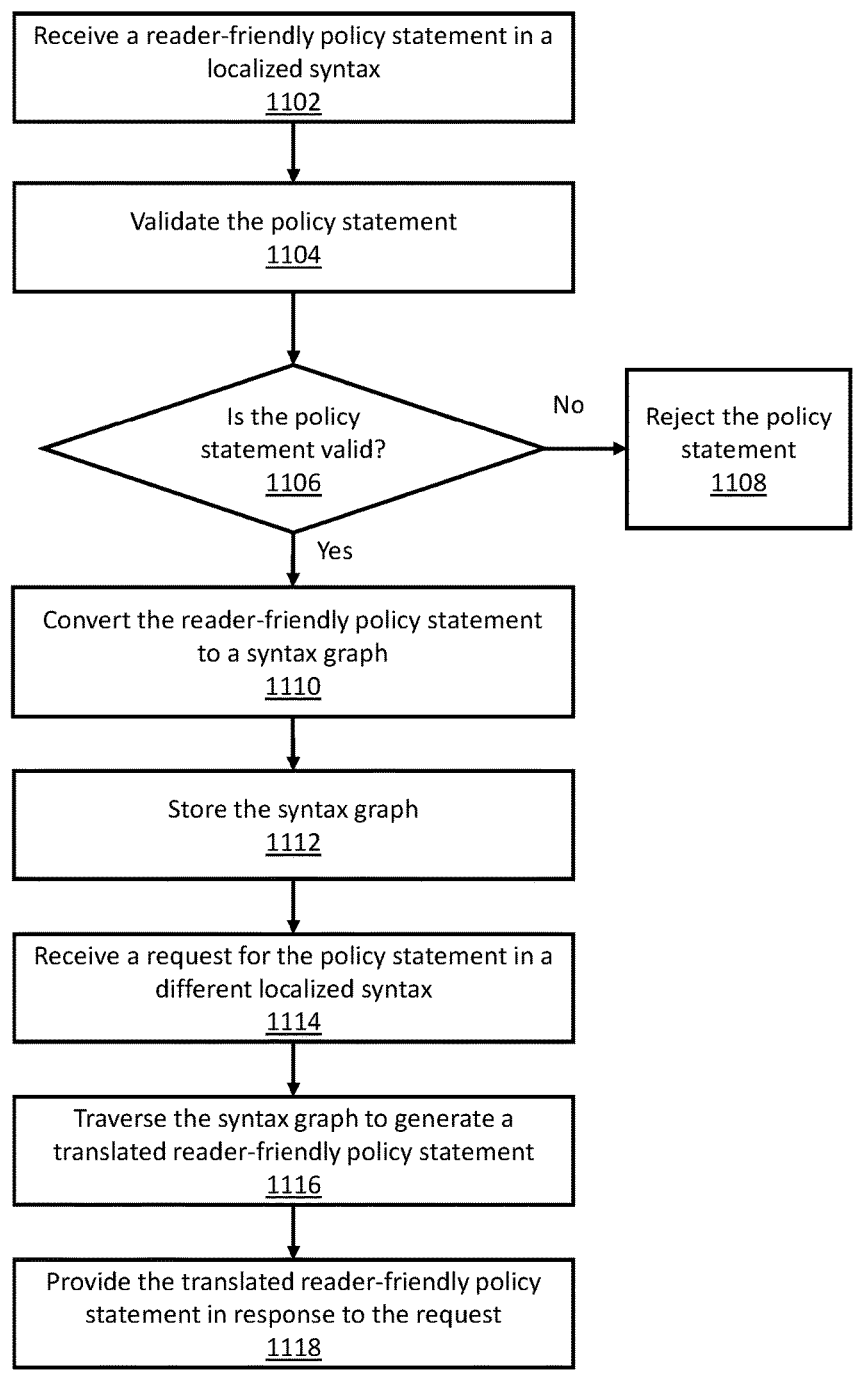
FIG. 11 shows a flowchart that illustrates an example set of operations for localizing policy statements in accordance with one or more embodiments.

FIG. 11 illustrates an example set of operations for localizing a policy statement in accordance with one or more embodiments. One or more operations illustrated in FIG. 11 may be modified, rearranged, or omitted all together. Accordingly, the particular sequence of operations illustrated in FIG. 11 should not be construed as limiting the scope of one or more embodiments. In the following description, in accordance with one or more embodiments, the operations illustrated in FIG. 11 are performed by a policy management service 124 as illustrated in FIG. 1. Alternatively or in addition, one or more of the operations illustrated in FIG. 11 may be performed by other components.

In one or more embodiments, the policy management service 124 receives a reader-friendly policy statement in a localized syntax (Operation 1102). The policy statement may be received, for example, from a human user via a graphical user interface.

In one or more embodiments, the policy management service 124 determines whether the policy statement is valid (Operation 1104). Validating the policy statement involves one or more operations described above. The policy management service 124 may determine that the policy statement's syntax is valid and/or that the policy statement's semantics are valid.

In one or more embodiments, if the policy statement is not valid, then the policy management service 124 rejects the policy statement (Operation 1108). Rejecting the policy statement may involve providing a reader-friendly error message. For example, if the policy statement was received from a human user, then the error message may provide information about why the policy statement was rejected. The human user may then have an opportunity to correct the policy statement, i.e., edit the policy statement so it is valid.

In one or more embodiments, if the policy statement is valid, then the policy management service 124 converts the policy statement to a syntax graph (Operation 1110) and stores the syntax graph (Operation 1112). Converting the policy statement to a syntax graph and storing the syntax graph may involve one or more operations described above.

In one or more embodiments, after storing the syntax graph, the policy management service 124 receives a request for the policy statement in a different localized syntax (Operation 1114). For example, if the policy statement was initially received (i.e., in Operation 1102) using an English-localized syntax, the subsequent request (i.e., Operation 1114) may be for the policy statement in a German-localized syntax.

In one or more embodiments, the policy management service 124 traverses the syntax graph to generate a translated reader-friendly policy statement, i.e., a translation of the received policy statement that uses the requested localized syntax instead of the original localized syntax (Operation 1116). Generating the policy statement may involve using one or more keywords in the human language associated with the requested localized syntax, rather than keywords associated with the original localized syntax. For example, if the policy statement was received in an English-localized syntax and included the word 'allow,' then a policy statement in a French-localized syntax may instead use the word 'permettez.' Many different types and variations of keyword translations may be used. Alternatively or in addition, generating the policy statement in the localized syntax may involve placing terms in a different order than the order used in the original localized syntax. For example, as described above, nouns and verbs may be ordered differently in different languages.

In one or more embodiments, if the policy statement as received included one or more contextual hints, those hints may not be included in the translated policy statement. Alternatively or in addition, one or more hints may be translated to corresponding hints in the requested localized syntax. For example, the word 'to' may be used as a hint in English and may be translated to the word 'à' in French.

In one or more embodiments, the policy management service 124 provides the translated reader-friendly policy statement in response to the request (Operation 1118). For example, the policy management service 124 may provide the translated reader-friendly policy statement to a human user, e.g., via a graphical user interface.

In one or more embodiments, localized policy statements improve functioning of a computer-based authorization system by allowing users who speak different languages to collaborate more readily on the creation, review, and modification of authorization policies. In one or more embodiments, localized policy statements decrease the likelihood of human error by ensuring that policy statements are presented to each user in a localized syntax that approximates a human language spoken by that particular user. Thus, localized policy statements may decrease the likelihood of errors such as inadvertently granting or denying authorization, which in turn decreases the overhead associated with managing and enforcing authorization policies.

11. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
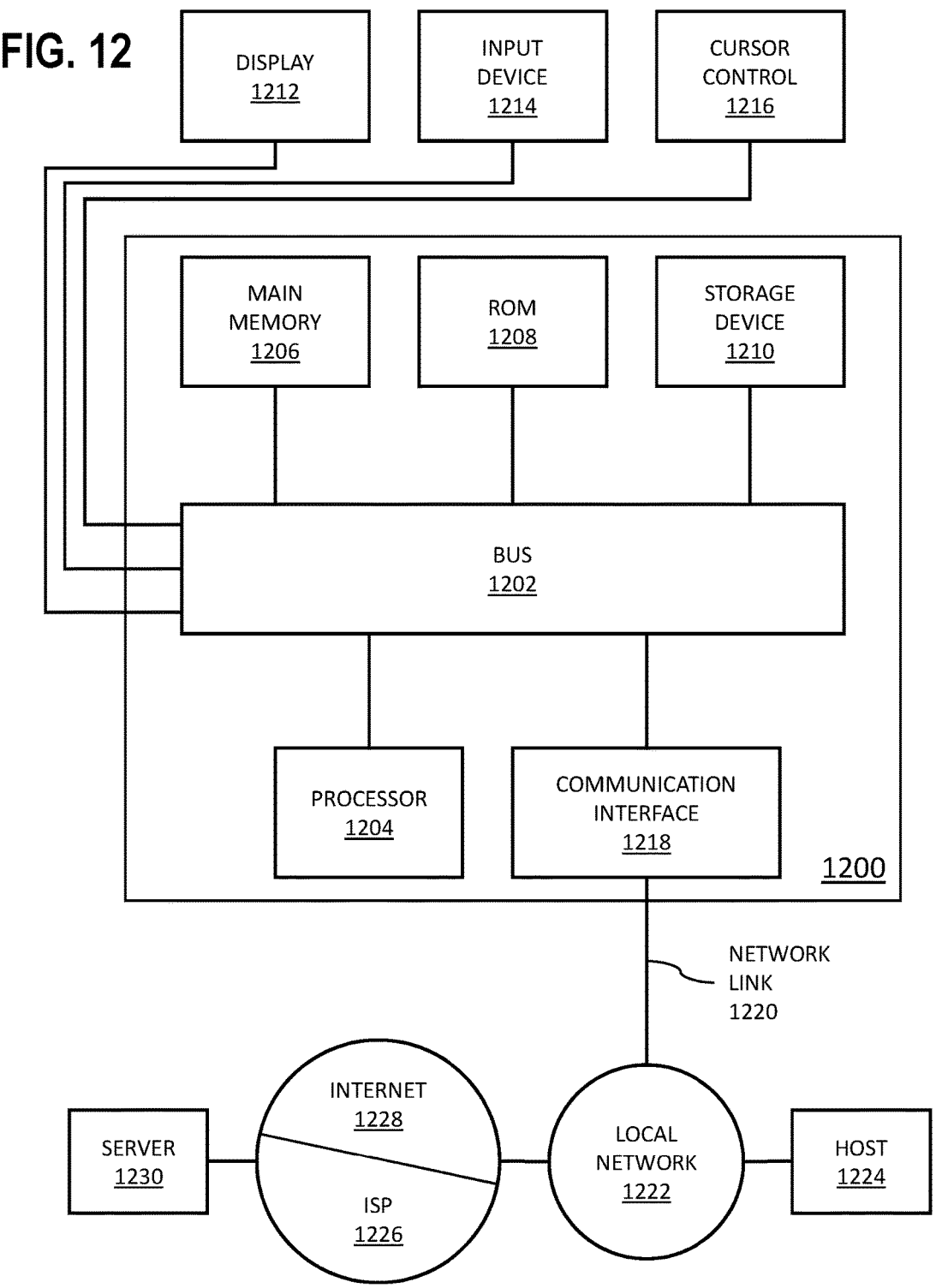
FIG. 12 shows a block diagram that illustrates a computer system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause:
   receiving a first authorization request and first partial contextual information associated with the first authorization request;
   submitting the first partial contextual information to an authorization service without submitting first complete contextual information associated with the first authorization request, wherein the first partial contextual information is a subset of the first complete contextual information;
   receiving, from the authorization service, a first preliminary authorization response based on evaluation of the first partial contextual information against one or more authorization policies, the first preliminary authorization response comprising non-denial of the first authorization request;
   based on the first preliminary authorization response comprising non-denial of the first authorization request, further processing the first authorization request at least by:
      obtaining a first final authorization result based on evaluation of the first complete contextual information associated with the first authorization request against the one or more authorization policies;
      responsive to the first authorization request, providing the first final authorization result;
   receiving a second authorization request and second partial contextual information associated with the second authorization request;
   submitting the second partial contextual information to the authorization service without submitting second complete contextual information associated with the second authorization request;
   receiving, from the authorization service, a second preliminary authorization response based on evaluation of the second partial contextual information against the one or more authorization policies, the second preliminary authorization response comprising denial of the second authorization request;

denying the second authorization request based on the second preliminary authorization response.

2. The one or more media of claim 1, wherein the second preliminary authorization response is further based on the authorization service failing to locate policy data corresponding to the second authorization request.

3. The one or more media of claim 1, further storing instructions which, when executed by one or more processors, cause:

refraining from further processing of the second complete contextual information after denying the second authorization request.

4. The one or more media of claim 1, wherein the first preliminary authorization response further comprises policy data associated with the one or more authorization policies, and wherein obtaining the first final authorization result is performed using the policy data received from the authorization service, without submitting the first complete contextual information to the authorization service.

5. The one or more media of claim 4, wherein the policy data comprises a syntax graph, hierarchy data comprising at least two levels of hierarchy of system locations, and group membership data.

6. The one or more media of claim 1, wherein the first preliminary authorization response further comprises policy data associated with the one or more authorization policies, the one or more media further storing instructions which, when executed by one or more processors, cause:

receiving a third authorization request and third partial contextual information associated with the third authorization request; and responsive to the third authorization request, obtaining a third preliminary authorization response using the policy data received from the authorization service, without submitting the third partial contextual information to the authorization service.

7. The one or more media of claim 1, wherein the first partial contextual information comprises a requestor identifier and an application programming interface (API) call identifier, and does not include location and conditions.

8. The one or more media of claim 7, wherein the first complete contextual information comprises the first partial contextual information and a location identifier.

9. The one or more media of claim 8, wherein the first complete contextual information further comprises a variable associated with a user-defined condition for satisfying an authorization policy, wherein the user-defined condition is different from any system-defined condition.

10. The one or more media of claim 1, wherein obtaining the first final authorization result based on the first complete contextual information is performed locally by a thick client, and wherein obtaining a second final authorization result based on third complete contextual information is performed by the authorization service for a thin client.

11. The one or more media of claim 1,
wherein the first preliminary authorization response further comprises policy data associated with the one or more authorization policies, and wherein obtaining the first final authorization result is performed using the policy data received from the authorization service, without submitting the first complete contextual information to the authorization service, wherein the policy data comprises a syntax graph, hierarchy data comprising at least two levels of hierarchy of system locations, and group membership data, wherein obtaining the first final authorization result based on the first complete contextual information is performed locally by a thick client, wherein obtaining a second final authorization result based on third complete contextual information is performed by the authorization service for a thin client, wherein the first preliminary authorization response further comprises policy data associated with the one or more authorization policies, the one or more media further storing instructions which, when executed by one or more processors, cause:

refraining from further processing of the second complete contextual information after denying the second authorization request;

receiving a third authorization request and third partial contextual information associated with the third authorization request; and responsive to the third authorization request, obtaining a third preliminary authorization response using the policy data received from the authorization service, without submitting the third partial contextual information to the authorization service.

12. A system comprising:
at least one device including a hardware processor;
the system being configured to perform operations comprising:

receiving a first authorization request and first partial contextual information associated with the first authorization request;

submitting the first partial contextual information to an authorization service without submitting first complete contextual information associated with the first authorization request, wherein the first partial contextual information is a subset of the first complete contextual information;

receiving, from the authorization service, a first preliminary authorization response based on evaluation of the first partial contextual information against one or more authorization policies, the first preliminary authorization response comprising non-denial of the first authorization request;

based on the first preliminary authorization response comprising non-denial of the first authorization request, further processing the first authorization request at least by:

obtaining a first final authorization result based on evaluation of the first complete contextual information associated with the first authorization request against the one or more authorization policies;

responsive to the first authorization request, providing the first final authorization result;

receiving a second authorization request and second partial contextual information associated with the second authorization request;

submitting the second partial contextual information to the authorization service without submitting second complete contextual information associated with the second authorization request;

receiving, from the authorization service, a second preliminary authorization response based on evaluation of the second partial contextual information against the one or more authorization policies, the second preliminary authorization response comprising denial of the second authorization request;
denying the second authorization request based on the second preliminary authorization response.

13. The system of claim 12, wherein the second preliminary authorization response is further based on the authorization service failing to locate policy data corresponding to the second authorization request.

14. The system of claim 12, wherein the operations further comprise:
refraining from further processing of the second complete contextual information after denying the second authorization request.

15. The system of claim 12, wherein the first preliminary authorization response further comprises policy data associated with the one or more authorization policies, and wherein obtaining the first final authorization result is performed using the policy data received from the authorization service, without submitting the first complete contextual information to the authorization service.

16. The system of claim 15, wherein the policy data comprises a syntax graph, hierarchy data comprising at least two levels of hierarchy of system locations, and group membership data.

17. The system of claim 12, wherein the first preliminary authorization response further comprises policy data associated with the one or more authorization policies, and wherein the operations further comprise:
receiving a third authorization request and third partial contextual information associated with the third authorization request; and
responsive to the third authorization request, obtaining a third preliminary authorization response using the policy data received from the authorization service, without submitting the third partial contextual information to the authorization service.

18. A method comprising:
receiving a first authorization request and first partial contextual information associated with the first authorization request;
submitting the first partial contextual information to an authorization service without submitting first complete contextual information associated with the first authorization request wherein the first partial contextual information is a subset of the first complete contextual information;
receiving, from the authorization service, a first preliminary authorization response based on evaluation of the first partial contextual information against one or more authorization policies, the first preliminary authorization response comprising non-denial of the first authorization request;
based on the first preliminary authorization response comprising non-denial of the first authorization request, further processing the first authorization request at least by:
obtaining a first final authorization result based on evaluation of the first complete contextual information associated with the first authorization request against the one or more authorization policies;
responsive to the first authorization request, providing the first final authorization result;
receiving a second authorization request and second partial contextual information associated with the second authorization request;
submitting the second partial contextual information to the authorization service without submitting second complete contextual information associated with the second authorization request;
receiving, from the authorization service, a second preliminary authorization response based on evaluation of the second partial contextual information against the one or more authorization policies, the second preliminary authorization response comprising denial of the second authorization request;
denying the second authorization request based on the second preliminary authorization response,
wherein the method is performed by at least one device comprising a hardware processor.

19. The one or more media of claim 1, wherein submitting the first partial contextual information to the authorization service is performed before the first complete contextual information is available to be submitted to the authorization service.

20. The one or more media of claim 19, further storing instructions which, when executed by one or more processors, cause:
subsequent to submitting the first partial contextual information to the authorization service and before receiving the first preliminary authorization response: continuing to execute a process for obtaining the first complete contextual information.

* * * * *